United States Patent

Ebisawa et al.

(10) Patent No.: US 6,783,861 B2
(45) Date of Patent: Aug. 31, 2004

(54) GLAZING PANEL

(75) Inventors: Junichi Ebisawa, Kanagawa (JP); Nobutaka Aomine, Kanagawa (JP); Satoshi Takeda, Kanagawa (JP); Kazuyoshi Noda, Kanagawa (JP); Daniel Decroupet, Jumet (BE)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 10/394,161

(22) Filed: Mar. 24, 2003

(65) Prior Publication Data

US 2003/0186062 A1 Oct. 2, 2003

Related U.S. Application Data

(63) Continuation of application No. 09/466,786, filed on Dec. 20, 1999, now Pat. No. 6,562,490.

(30) Foreign Application Priority Data

Dec. 18, 1998 (EP) .............................................. 98204317

(51) Int. Cl.$^7$ .............................................. B32B 17/06
(52) U.S. Cl. ...................... 428/432; 428/428; 428/673; 428/658; 428/697; 428/698; 428/701; 428/702; 428/704
(58) Field of Search .................................. 428/428, 432, 428/658, 672, 697, 698, 701, 702, 704

(56) References Cited

U.S. PATENT DOCUMENTS

| | | |
|---|---|---|
| 4,462,883 A | 7/1984 | Hart et al. |
| 4,786,563 A | 11/1988 | Gillery et al. |
| 4,806,220 A | 2/1989 | Finley |
| 4,822,120 A | 4/1989 | Fan et al. |
| 4,898,789 A | 2/1990 | Finley |
| 4,943,484 A | 7/1990 | Goodman |
| 5,271,994 A | 12/1993 | Termath |
| 5,834,103 A | 11/1998 | Bond et al. .................. 428/216 |
| 5,837,361 A | 11/1998 | Glaser et al. |
| 5,935,702 A | 8/1999 | Macquart ..................... 428/336 |

FOREIGN PATENT DOCUMENTS

| | | |
|---|---|---|
| EP | 0 233 003 | 8/1987 |
| EP | 0 464 789 | 1/1992 |
| EP | 0 636 587 | 2/1995 |
| EP | 0 718 250 | 6/1996 |
| EP | 0 751 099 | 1/1997 |

Primary Examiner—Terrel Morris
Assistant Examiner—Andrew T. Piziali
(74) Attorney, Agent, or Firm—Oblon, Spivak, McClelland, Maier & Neustadt, P.C.

(57) ABSTRACT

A glazing panel carrying a coating stack comprises in sequence at least:
 a glass substrate
 a base antireflective layer
 an infra-red reflecting layer, and
 a top antireflective layer
and is characterised in that at least one of the antireflective layers comprises at least one mixed oxide layer which comprises an oxide which is a mixture of Zn and at least one additional material X, in which the atomic ratio X/Zn is greater than or equal to 0.12 and in which X is one or more of the materials selected from the group comprising the elements of groups 2a, 3a, 5a, 4b, 5b, 6b of the periodic table. The glazing panel exhibits a combination of advantageous properties, particularly thermal stability.

15 Claims, 1 Drawing Sheet

US 6,783,861 B2

GLAZING PANEL

This application is a continuation of Ser. No. 09/466,786, filed on Dec. 20, 1999, now U.S. Pat. No. 6,562,490.

BACKGROUND OF THE INVENTION

1. Field of the Invention

This invention relates to glazing panels and particularly, but not exclusively, to solar control glazing panels which are intended to undergo heat treatment following application of a solar control filter.

2. Discussion of Background

EP 233003A describes a glazing panel carrying a sputter coated optical filter having the structure: glass substrate/ SnO2 base dielectric/first metallic barrier of Al, Ti, Zn, Zr or Ta/Ag/second metallic barrier of Al, Ti, Zn, Zr or Ta/SnO2 top dielectric. The optical filter is designed to block a significant portion of the incident radiation in the infra red portion of the spectrum whilst allowing passage of a significant portion of the incident radiation in the visible portion of the spectrum. In this way, the filter acts to reduce the heating effect of incident sunlight whilst allowing good visibility through the glazing and is particularly suitable for car windscreens.

In this type of structure, the Ag layer acts to reflect incident infra red radiation and in order to fulfill this role must be maintained as silver metal rather than silver oxide and must not be contaminated by adjacent layers. The dielectric layers which sandwich the Ag layer serve to reduce the reflection of the visible portion of the spectrum which the Ag layer would otherwise provoke. The second barrier serves to prevent oxidation of the Ag layer during sputtering of the overlying SnO2 dielectric layer in an oxidising atmosphere; this barrier is at least partially oxidised during this process. The main role of the first barrier is to prevent oxidation of the silver layer during heat treatment of the coating (e.g. during bending and/or tempering) of the glazing panel by being oxidised itself rather than allowing passage of oxygen to the Ag layer. This oxidation of the barrier during heat treatment provokes an increase in TL of the glazing panel.

EP 792847A discloses a heat treatable solar control glazing panel which is based on the same principle and has the structure: glass substrate/ZnO dielectric/Zn barrier/Ag/Zn barrier/ZnO dielectric/Zn barrier/Ag/Zn barrier/ZnO dielectric. The Zn barriers positioned below each of the Ag layers are intended to be oxidised completely during heat treatment and serve to protect the Ag layers from oxidation. As well known in the art, the structure of having two, spaced Ag layers rather than a single Ag layer increases the selectivity of the filter.

EP 275474 A discloses a heat treatable solar control panel having the structure: glass substrate/zinc stannate dielectric/ Ti barrier/Ag/Ti barrier/zinc stannate dielectric. Ti barriers are generally favoured in this type of heat treatable structure due to their high affinity for oxygen and relative ease with which they can be oxidised to form titanium oxide.

SUMMARY OF THE INVENTION

The present invention provides a glazing panel.

Figure 1:
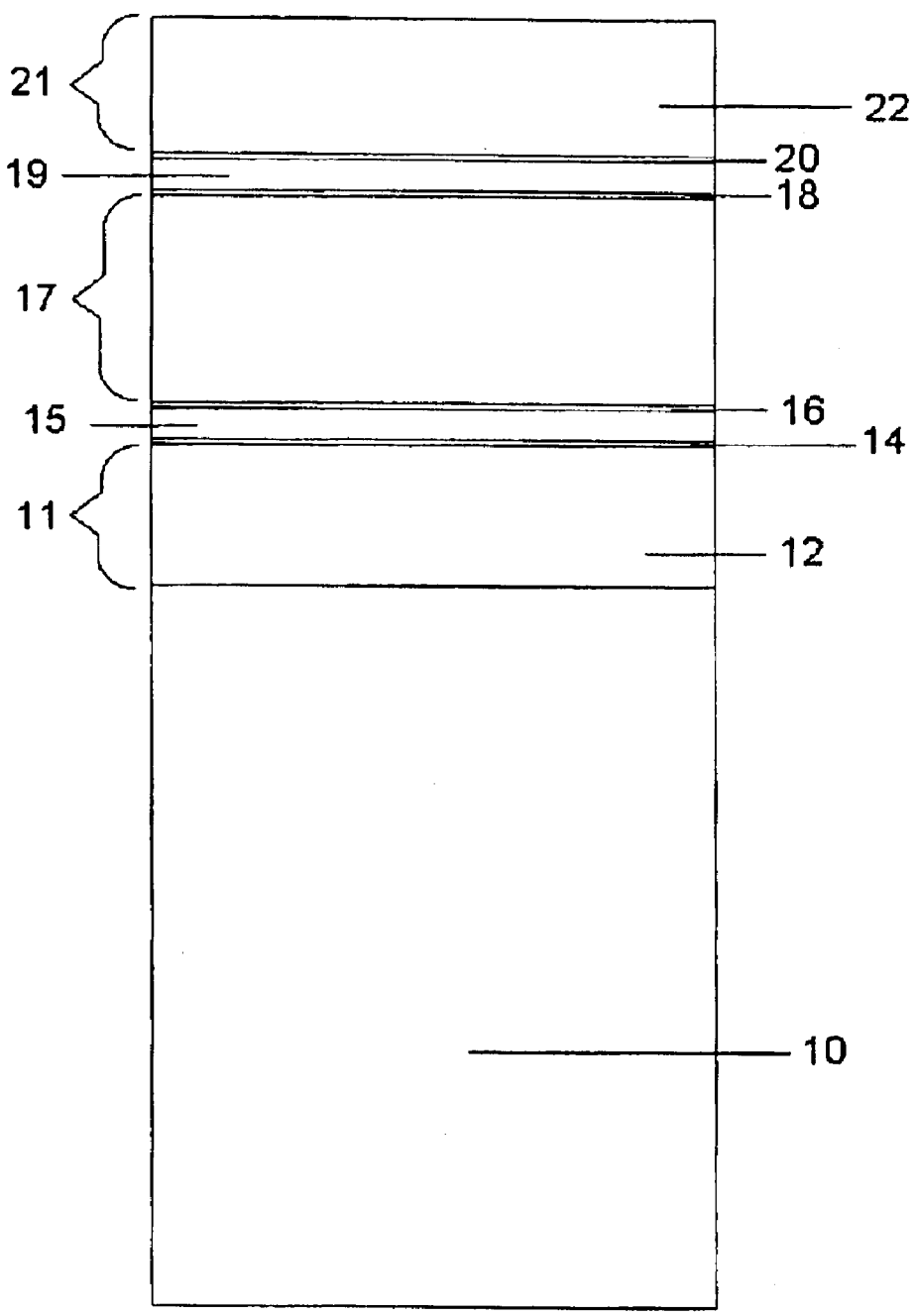
FIG. 1 shows a glazing panel having the following sequential structure.

glass substrate 10
antireflective layer 11, comprising antireflective layer 12 and barrier layer 14,
infrared reflective layer 15,
barrier layer 16,
antireflective layer 17,
barrier layer 18,
infrared reflective layer 19,
antireflective layer 21 comprising barrier layer 20 and antireflective layer 22.

The antireflective layer is a layer composed of at least one member selected from the group consisting of oxides, nitrides and carbides and double compounds thereof.

As the oxide, for example, an oxide of at least one element selected from the group consisting of Zn, Ti, Sn, Si, Al, Ta or Zr may be mentioned. In addition, for example, zinc oxide containing Al, Ga, Si or Sn or indium oxide containing Sn may be mentioned.

As the nitride, a nitride of at least one element selected from the group consisting of Si, Al and B (a nitride (A)) or a mixture (inclusive of a double nitride) of a nitride of Zr or Ti with a nitride (A) may be mentioned.

As the double compound, $SiO_xC_y$, $SiO_xN_y$, $SiAl_xN_y$ or $SiAl_xO_yN_z$ may be mentioned. The antireflective layer may be a single layer or a multiple layer.

Especially, a zinc oxide or a zinc oxide containing at least one element selected from the group consisting of Sn, Al, Cr, Ti, Si, B, Mg, In and Ga is preferable, because it makes it possible to stably form an adjacent infra-red reflecting layer with a high crystallinity. Especially, a zinc oxide containing Al and/or Ti is preferable.

The infra-red reflecting material is a material that has a reflectance higher than the reflectance of sodalime glass in the band of wavelength between 780 nm and 50 $\mu$m.

The infra-red reflecting layer is a layer composed of Ag only or a layer comprising Ag as the main component and an additional metal element (such as Pd, Au or Cu). When an additional metal element is contained, the content of the additional metal element is preferably from 0.3 to 10 at %, more preferably from 0.3 to 5 at %, based on the total of Ag and the additional metal element. If the content of an additional metal element is less than 0.3 at %, the effect of stabilizing Ag is small. Also, if the content of an additional metal element exceeds 10 at %, the effect of stabilizing Ag diminishes. Especially, Pd as the additional metal element can immobilize Ag atoms, namely depress the migration of Ag atoms and affords a layer which is excellent in stability and chemical resistance at high temperatures. As the Pd content increases, the rate of film formation tends to decrease, the visible light transmittance tends to lower, and the shielding selectivity between visible rays and near infrared rays tends to become poor. Therefore, the Pd content is preferred to be at most 5.0 at %, especially from 0.3 to 2.0 at %.

When the glass laminate of the present invention comprises more than one infra-red reflecting layer, each infra-red reflecting layer may have the same composition or a different composition. The infra-red reflecting layer may be a multiple layer comprising at least two laminated films, for example, a multiple layer composed of Ag and Pd.

In a glazing panel having a three layer type laminated coating, the thicknesses of the base antireflective layer, the infra-red layer and the top antireflective layer layer are preferably from 15 to 45 nm, from 9 to 16 nm (especially from 9 to 12 nm) and from 30 to 45 nm, respectively. A glazing panel comprising a colorless soda lime glass substrate of 2 mm thick and a three layer type laminated coating formed on the substrate has such representative optical properties as a luminous transmittance (TL) of about from 75 to 85% and an energetic transmittance (TE) of about from 50 to 70% after heat treatment.

In a glazing panel having a five layer type laminated coating, the thicknesses of the base antireflective layer, the infra-red layer the central antireflective layer, the infra-red layer and the top antireflective layer layer are preferably from 16 to 50 nm (especially from 20 to 45 nm), from 6.5 to 16 nm (especially from 6.5 to 12.5 nm), from 40 to 100 nm (especially from 45 to 90 nm), from 6.5 to 16 nm (especially from 6.5 to 12.5 nm) and from 16 to 50 nm (especially from 20 to 45 nm), respectively. A glazing panel comprising a colorless soda lime glass substrate of 2 mm thick and a five layer type laminated coating formed on the substrate has such representative optical properties as a luminous transmittance (TL) of about from 70 to 80% and an energetic transmittance (TE) of about from 40 to 50% after heat treatment.

DETAILED DESCRIPTION OF THE INVENTION

Providing at least one of the antireflective layers comprising a mixture of Zn and one of the specified additional materials provides an advantageous combination of properties. The antireflective layer must not only carry out its principal role of preventing excessive reflection in the visible portion of the spectrum but must also for example, be compatible with the other layers in the coating stack, be mechanically and chemically resistant and be suited to production on an industrial scale.

Any suitable method or combination of methods may be used to deposit the coating layers. For example, evaporation (thermal or electron beam), liquid pyrolysis, chemical vapour deposition, vacuum deposition and sputtering, particularly magnetron sputtering, the latter being particularly preferred. Different layers of the coating stack may be deposited using different techniques.

The antireflective layer according to the present invention may provide an advantageous combination of:

thermal stability if the glazing panel is heated, for example during tempering and/or bending. Notably, use of the present invention may reduce degradation of the infra red reflecting layer when compared with comparable structures using, for example, known ZnO or $SnO_2$ antireflective layers.

ease and controllability of deposition: the antireflective layer according to the present invention may be deposited more easily and with more control than, for example, $Al_2O_3$ or $SiO_2$. Whilst $Al_2O_3$ and $SiO_2$ show a good degree of thermal stability they are difficult to deposit using common sputtering techniques.

mechanical resistance: the antireflective layer according to the present invention may be used without prejudicing the mechanical resistance of the coating. In particular, it may perform well in pummel tests when the glazing panel is used in a laminated structure.

compatibility with Ag: crystallisation of the Ag layer affects its optical properties. A pure ZnO layer adjacent the Ag can lead to excessive crystallisation of the Ag and to problems of haze in the coating, particularly during heat treatment. However, where an antireflective layer does not consist of ZnO there may be insufficient recrystallisation of the Ag layers resulting in a level of infra red reflection and a level of electrical conductivity in the coating which are below the optimum obtainable. The present invention may be used to favour crystallisation to a sufficient degree to provide good infra red reflecting properties whilst avoiding excessive haze. In particular, it may provide a favourable crystallisation compared with an antireflective layer composed of $TiO_2$. One possible explanation for this may be that the presence of the material X in the zinc oxide structure may reduce the crystal grain growth in the mixed oxide layer, especially perpendicular to the substrate. This may result in a less crystalline, more amorphous structure which reduces diffusion that might otherwise be likely to occur at crystal grain boundaries.

production cycle time: an oxide layer which is a mixture of Zn and at least one of the specified addition materials, particularly when the additional material is Ti, Ta, Zr, Nb, Bi or a mixture of these metals, will generally have a higher refractive index than antireflective layers of, for example, ZnO and $SnO_2$, which are commonly used in similar structures and yet will be quicker to deposit than known antireflective layers having relatively high refractive indexes, for example, $TiO_2$. Consequently, this may enable the production cycle time to be improved.

good selectivity: the higher refractive index may, in addition, facilitate an increase in the selectivity of the coating stack, particularly when the additional material is Ti, Ta, Zr, Nb, Bi or a mixture of these metals.

Use of the antireflective layer in accordance with the present invention as the or part of the top antireflective layer, particularly as a layer exposed to the atmosphere may provide good chemical and mechanical resistance. Furthermore, it may provide good compatibility with a laminating film, for example a pvb film, if the glazing panel is to be laminated to form, for example, a car windscreen or other laminated glazing panel.

The advantageous properties of the antireflective layer according to the present invention may not be obtainable if the atomic ratio X/Zn is below the specified minimum, for example, if the material X is present only in the form of an impurity or if the atomic ratio X/Zn is not sufficiently great.

The atomic ratio X/Zn may be less than about 5; it may be less that or equal to about 4 or to about 3. This may ensure a sufficient quantity of Zn in the antireflective layer to provide advantageous properties.

The advantageous combination of properties obtainable with the antireflective layer according to the present invention may be utilized in a coating stack having two, or indeed more than two, spaced infra-red reflecting layers.

Multiple spaced infra-red reflecting layers may be used to provide the glazing panel with a selectivity that is greater than 1.5 or 1.7.

Particularly advantageous properties may be obtained if additional material X consists essentially of Ti of Ti with one or more additional materials from the specified group of materials, for example, Ti and Al essentially of Al of Al with one or more additional materials from the specified group of materials.

The combination of properties that may be provided by the present invention have particular advantages in relation to heat treatable and heat treated glazing panels. Nevertheless, the invention may also be used in respect of glazings which are not heat treated. The term "heat treatable glazing panel" as used herein means that the glazing panel carrying the coating stack is adapted to undergo a bending and/or thermal tempering and/or thermal hardening operation and/or other heat treatment process without the haze of the so treated glazing panel exceeding 0.5, and preferably without the haze exceeding 0.3. The term "substantially haze free heat treated glazing panel" as used herein means a glazing panel carrying a coating stack which has been bent and/or thermally tempered and/or thermally hardened and has a haze that does not exceed 0.5 and which preferably does not exceed 0.3.

In the present invention, a glazing panel can be subjected to heat treatment for 1) bending, 2) tempering, 3) sintering of colored ceramic print or silver bus bar print, 4) vacuum sealing of vacuum double glazing and 5) calcination of a wet-coated low reflective coating or antiglare coating. For example, it is heated to a temperature of from 570 to 700° C. in the atmosphere for 1) bending or 2) tempering.

Arranging the thickness of the mixed oxide layer in accordance with the present invention to have a thickness of at least 50 Å may provide a sufficient quantity to have a worthwhile or noticeable effect. The geometrical thickness of the mixed oxide layer in accordance with the present invention may be at least 80 Å, 100 Å, 120 Å, 140 Å or 160 Å.

An oxide layer which is a mixture of Zn and at least one of the specified addition materials may be used to confer advantageous properties on one, more than one or preferably all of the antireflective layer in the coating stack. Use in all of the antireflective layers of the coating stack may simplify process control and ordering and storage of the necessary targets. Where more than one antireflective layers comprises an oxide layer which is a mixture of Zn and at least one of the specified addition materials, such oxide layers may have the same or substantially the same composition.

A particularly advantageous combination of the properties discussed above may be obtained when the atomic ratio X/Zn is within the range of about 0.12–1, preferably about 0.15–0.6 and more preferably about 0.2–0.5.

The oxide layer in accordance with the present invention may be compatible for use with and may be advantageously combined in one or more of the antireflective layers with a layer comprising a nitride of aluminum or a nitride of silicon or a mixture thereof. This may provide particularly good thermal stability, particularly when the combination is used in the base and/or the top antireflective layer.

The filter stack may comprise one or more barrier layers underlying and/or overlying the infra red reflecting layer, as is known in the art. Barriers of, for example, one or more of the following material may be used: Ti, Zn, Ta, Cr, "stainless steel", Zr, Ni, NiCr, ZnTi NiTi and ZnAl. Such barriers may be deposited, for example, as metallic layers or as sub-oxides (i.e. partially oxidised layers). Alternatively, nitrided barrier layers may also be used.

One or more of such barrier layers may comprise the same materials as the mixed oxide layer, particularly the adjacent mixed oxide layer. This may facilitate management of targets and control of deposition conditions and in the latter case may prove good adhesion between the layers and thus good mechanical durability of the coating stack.

Heat treatment may provoke an increase in the TL of the glazing panel. Such an increase in TL may be advantageous in ensuring that TL is sufficiently high for the glazing panel to be used in a vehicle windscreen. TL may increase in absolute terms during heat treatment by, for example, greater than about 2.5%, greater than about 3%, greater than about 5%, greater than about 8% or greater than about 10%.

According to another aspect, the present invention provides a method of manufacturing a glazing panel. Such a method may be used to manufacture, for example, heat treated architectural glazing panels, vehicle glazings and particularly windscreens.

Examples of the present invention will now be described with reference to FIG. 1 which is a cross-section through a glazing panel prior to a bending and tempering operation (for ease of representation, the relative thicknesses of the glazing panel and coating layers are not shown to scale).

EXAMPLE 1

FIG. 1 shows a double Ag layer, heat treatable, coating layer deposited on a glass substrate by magnetron sputtering and having the following sequential structure:

| | Reference number | Geometrical thickness | Atomic ratios |
|---|---|---|---|
| Glass substrate | 10 | 2 mm | |
| Base dielectric comprising: ZnTiOx | 11 12 | 280 Å | Ti/Zn = 0.25 |
| ZnTiOy underlying barrier | 14 | 15 Å | Ti/Zn = 2.5 |
| Ag | 15 | 100 Å | |
| Ti overlying barrier | 16 | 20 Å | |
| Central dielectric comprising ZnTiOx | 17 | 680 Å | Ti/Zn = 0.25 |
| ZnTiOy underlying barrier | 18 | 10 Å | Ti/Zn = 2.5 |
| Ag | 19 | 100 Å | |
| Ti overlying barrier | 20 | 20 Å | |
| Top dielectric comprising ZnTiOx | 21 22 | 240 Å | Ti/Zn = 0.25 | in which ZnTiOx is a mixed oxide containing Zn and Ti deposited in this example by reactively sputtering a target which is an alloy or mixture of Zn and Ti in the presence of oxygen. The ZnTiOy barriers are similarly deposited by sputtering a target which is an alloy or mixture of Zn and Ti in an argon rich oxygen containing atmosphere to deposit a barrier that is not fully oxidised.

Alternatively, a mixed oxide layer may be formed by sputtering a target which is a mixture of zinc oxide and an oxide of material X, particularly in an argon gas or argon rich oxygen containing atmosphere.

The oxidation state in each of the base, central and top ZnTiOx dielectric layers need not necessarily be the same. Similarly, the oxidation state in each of the ZnTiOy barriers need not be the same. Equally, the Ti//Zn ratio need not be the same for all of the layers; for example, the barrier layers may have a different Ti/Zn ratio to the antireflective dielectric layers and the antireflective dielectric layers may have different Ti/Zn ratios from each other.

Each overlying barrier protects its underlying silver layer from oxidation during sputter deposition of its overlying ZnTiOx oxide layer. Whilst further oxidation of these barriers layers may occur during deposition of their underlying oxide layers a portion of these barriers preferably remains in the form of an oxide that is not fully oxidised to provide a barrier for subsequent heat treatment of the glazing panel.

This particular glazing panel is intended for incorporation in a laminated vehicle windscreen and displays the following properties:

| Property | Prior to heat treatment[see Note 1 below] | Following heat treatment[see Note 2 below] |
|---|---|---|
| TL (Illuminant A) | 64% | 77% |
| TE (System Moon 2) | 39% | 40% |
| haze | 0.1 | 0.28 |

-continued

| Property | Prior to heat treatment[see Note 1 below] | Following heat treatment[see Note 2 below] |
|---|---|---|
| a* | −12 (coated side) | −3 (external) |
| b* | +4 (coated side) | −8 (external) |
| RE (System Moon 2) | 33% (coated side) | 34% (external) |

[Note 1] Measured for monolithic glazing panel with coating prior to heat treatment
[Note 2] Measured following heat treatment at 650° C. for 10 minutes followed by bending and tempering, and lamination with clear 2 mm glass sheet and 0.76 mm clear pvb Heat treatment preferably causes substantially complete oxidation of all of the barrier layers such that the structure of the coating stack after heat treatment is:

|  | Reference number | Geometrical thickness | Atomic ratios |
|---|---|---|---|
| Glass substrate | 10 | 2 mm |  |
| Base dielectric comprising: | 11 |  |  |
| ZnTiOx | 12 | 280 Å | Ti/Zn = 0.25 |
| ZnTiOx (oxidised underlying barrier) | 14 | 22 Å–28 Å | Ti/Zn = 2.5 |
| Ag | 15 | 100 Å |  |
| TiOx | 16 | 30 Å–40 Å |  |
| Central dielectric comprising ZnTiOx | 17 | 680 Å | Ti/Zn = 0.25 |
| ZnTiOx (oxidised underlying barrier) | 18 | 15 Å–20 Å | Ti/Zn = 2.5 |
| Ag | 19 | 100 Å |  |
| TiOx (oxidised overlying barrier) | 20 | 30 Å–40 Å |  |
| Top dielectric comprising: | 21 |  |  |
| ZnTiOx | 22 | 240 Å | Ti/Zn = 0.25 |

The TiOx overlying barriers may be partially oxidised or may be fully oxidised to TiO2 depending upon the conditions of the heat treatment to which the glazing panel is subjected.

EXAMPLE 2

Example 2 is similar to Example 1, except that ZnAlOx is used in the antireflective layers. The coating stacks and properties of the Example are set out below:

|  | Reference number | Geometrical thickness | Atomic ratios |
|---|---|---|---|
| Glass substrate | 10 | 2 mm |  |
| Base dielectric comprising: ZnAlOx | 11 |  |  |
|  | 12 | 315 Å | Al/Zn = 0.4 |
| Ti underlying barrier | 14 | 10 Å |  |
| Ag | 15 | 100 Å |  |
| Ti overlying barrier | 16 | 20 Å |  |
| Central dielectric comprising ZnAlOx | 17 | 760 Å | Al/Zn = 0.4 |
| Ti underlying barrier | 18 | 8 Å |  |
| Ag | 19 | 100 Å |  |
| Ti overlying barrier | 20 | 20 Å |  |
| Top dielectric comprising: ZnAlOx | 21 |  |  |
|  | 22 | 270 Å | Al/Zn = 0.4 | in which ZnAlOx is a mixed oxide containing Zn and Al deposited in this example by reactively sputtering a target which is an alloy or mixture of Zn and Al in the presence of oxygen. The Ti barriers are deposited by sputtering a titanium target in a substantially inert, oxygen free atmosphere.

At least a portion of the overlying barriers 16, 20 is oxidised during deposition of their overlying oxide layers. Nevertheless, a portion of these barriers preferably remains in metallic form, or at least in the form of an oxide that is not fully oxidised to provide a barrier for subsequent heat treatment of the glazing panel.

This particular glazing panel is intended for incorporation in a laminated vehicle windscreen and displays the following properties:

| Property | Prior to heat treatment[see Note 1 below] | Following heat treatment[see Note 2 below] |
|---|---|---|
| TL (Illuminant A) | 61% | 76% |
| TE (System Moon 2) | 36% | 43% |
| haze | 0.1 | 0.29 |
| a* | −17 (coated side) | −4 (external) |
| b* | +6 (coated side) | −9 (external) |
| RE (System Moon 2) | 30% (coated side) | 32% (external) |

[Note 1] Measured for monolithic glazing panel with coating prior to heat treatment
[Note 2] Measured following heat treatment at 625° C. for 14 minutes followed by bending and tempering, and lamination with clear 2 mm glass sheet and 0.76 mm clear pvb Heat treatment preferably causes substantially complete oxidation of all of the barrier layers such that the structure of the coating stack after heat treatment is:

Coating stack following heat treatment

|  | Reference number | Geometrical thickness | Atomic ratios |
|---|---|---|---|
| Glass substrate | 10 | 2 mm |  |
| Base dielectric comprising: | 11 |  |  |
| ZnAlOx | 12 | 315 Å | Al/Zn = 0.4 |
| TiOx oxidised underlying barrier | 14 | 15 Å–20 Å |  |
| Ag | 15 | 100 Å |  |
| TiOx (oxidised overlying barrier) | 16 | 30 Å–40 Å |  |
| Central dielectric comprising ZnAlOx | 17 | 760 Å | Al/Zn = 0.4 |
| TiOx (oxidised underlying barrier) | 18 | 12 Å–15 Å |  |
| Ag | 19 | 100 Å |  |
| TiOx (oxidised overlying barrier) | 20 | 30 Å–40 Å |  |
| Top dielectric comprising: | 21 |  |  |
| ZnAlOx | 22 | 270 Å | Al/Zn = 0.4 |

In an alternative embodiment, the base dielectric layer of Example 2 may comprise a first layer of ZnAlOx having an atomic ratio Al/Zn of between 0.12 and 1, and an overlying layer of ZnAlOx having an atomic ratio Al/Zn which is less than that of the first layer, for example 0.1.

Additional layers may be introduced above, below or between the film stacking arrangement if desired without departing from the invention.

In addition to the advantageous optical properties that may be obtained, each of the examples provides a coating layer which may be electrically heated, for example, in an electrically heated car windscreen to provide a de-misting and/or de-frosting function with the addition of suitably placed electrical connectors.

The colour co-ordinates of the examples are particularly suited to car windscreens as they give a neutral or slightly blue appearance in reflection when the windscreen is mounted at an angle in the car body. For other applications, for example architectural applications, the colour in reflection may be adjusted as is known in the art by adjusting the thicknesses of the dielectric layers and/or silver layer(s).

The TL of the glazing panel may be adjusted to suit the desired application. For example

- if the glazing panel is to be used as a windscreen for the European market, TL may be selected to be greater than 75% (as required by European regulations).
- if the glazing panel is to be used as a windscreen for the US market, TL may be selected to be greater than 70% (as required by US regulations).
- if the glazing panel is to be used as a vehicle front sidelight, TL may be adjusted to be greater than 70% (as required by European regulations).
- if the glazing panel is to be used as a vehicle rear sidelight or a rear window for a vehicle, TL may be selected to be between about 30% and 70%.
- Such adjustment of TL may be achieved, for example,
- by adapting the thicknesses of the layers of the coating stack, in particular the thicknesses of the dielectric layers and/or the infra-red reflecting layer(s).
- by combining the coating stack with a tinted glass substrate.
- by combining the coating stack with a tinted pvb or other laminating layer.

Glossary

Unless otherwise indicated by the context, the terms listed below have the following meanings in this specification:

| | | |
|---|---|---|
| a* | | colour co-ordinate measured on the CIELab scale at normal incidence |
| Ag | silver | |
| Al | aluminium | |
| Al2O3 | aluminium oxide | |
| AlN | aluminium nitride | |
| b* | | colour co-ordinate measured on the CIELab scale at normal incidence |
| Bi | bismuth | |
| Cr | chromium | |
| haze | | the percentage of transmitted light which in passing through the specimen deviates from the incident beam by forward scattering, as measured in accordance with the ASTM Designation D 1003-61 (Reapproved 1988). |
| infra red reflecting material | | a material that has a reflectance higher than the reflectance of sodalime glass in the band of wavelenghts between 780 nm and 50 microns |
| Nb | niobium | |
| NiCr | | an alloy or mixture comprising nickel and chromium |
| NiTi | | an alloy or mixture comprising nickel and titanium |
| RE | energetic reflection | the solar flux (luminous and non-luminous) reflected from a substrate as a percentage of the incident solar flux |
| selectivity | | the ratio of the luminous transmittance to the solar factor i.e. TL/TE |
| SiO2 | silicon oxide | |
| Si3N4 | silicon nitride | |
| SnO2 | tin oxide | |
| Ta | tantalum | |
| TE | energetic transmittance | the solar flux (luminous and non-luminous) transmitted through a substrate as a percentage of the incident solar flux |
| Ti | titanium | |
| TL | luminous transmittance | the luminous flux transmitted through a substrate as a percentage of the incident luminous flux |
| Zn | zinc | |
| ZnAl | | an alloy or mixture comprising zinc and aluminium |
| ZnAlOx | | a mixed oxide containing zinc and aluminium |
| ZnAlOy | | a partially oxidised mixture comprising zinc and aluminium |
| ZnO | zinc oxide | |
| ZnTi | | an alloy or mixture comprising zinc and titanium |
| ZnTiOx | | a mixed oxide containing zinc and titanium |
| ZnTiOy | | a partially oxidised mixture comprising zinc and titanium |
| Zr | zirconium | |

What is claimed is:

1. A glazing panel carrying a coating stack comprising in sequence at least:

a glass substrate;

a base antireflective layer;

an infra-red reflecting layer; and a top antireflective layer, characterized in that at least one of the antireflective layers comprises at least one mixed oxide layer which comprises an oxide which is a mixture of Zn and at least one additional material X, in which the atomic ratio X/Zn is greater than or equal to 0.12 and in which X is at least one element selected from the group consisting of the elements of groups 2a, 3a, 5a, 4b, 5b, 6b (CAS) of the periodic table.

2. A glazing panel in accordance with claim 1 comprising in sequence at least:

a glass substrate;

a base antireflective layer;

an infra-red reflecting layer;

a central antireflective layer;

an infra-red reflecting layer; and a top antireflective layers, characterized in that at least one of the antireflective layers comprises at least one mixed oxide layer which comprises an oxide which is a mixture of Zn and at least one additional material X, in which the atomic ratio X/Zn is greater than or equal to 0.12 and in which X is at least one element selected from the group consisting of the elements of groups 2a, 3a, 5a, 4b, 5b, 6b (CAS) of the periodic table.

3. A glazing panel in accordance with claim 1, in which X is at least one element selected from the group consisting of Ti and Al.

4. A glazing panel in accordance with claim 1, in which the glazing panel is a heat treatable or substantially haze free heat treated glazing panel.

5. A glazing panel in accordance with claim 1, in which the at least one mixed oxide layer has a geometrical thickness greater than or equal to 50 Å.

6. A glazing panel in accordance with claim 1, in which each of the base antireflective layer and the top antireflective layer comprises at least one mixed oxide layer which comprises an oxide which is a mixture of Zn and at least one additional material X, in which the atomic ratio X/Zn is greater than or equal to 0.12 and in which X is at least one element selected from the group consisting of the elements of groups 2a, 3a, 5a, 4b, 5b, 6b (CAS) of the periodic table.

7. A glazing panel in accordance with claim 2, in which the central antireflective layer comprises at least one mixed oxide layer which comprises an oxide which is a mixture of Zn and at least one additional material X, in which the atomic ratio X/Zn is greater than or equal to 0.12 and in which X is at least one element selected from the group consisting of the elements of groups 2a, 3a, 5a, 4b, 5b, 6b (CAS) of the periodic table.

8. A glazing panel in accordance with claim 1, in which the atomic ratio X/Zn of the mixed oxide layer is within the range 0.12–1.

9. A glazing panel in accordance with claim 1, in which the atomic ratio X/Zn of the mixed oxide layer is within the range 0.15–0.6.

10. A glazing panel in accordance with claim 1, in which the atomic ratio X/Zn of the mixed oxide layer is within the range 0.2–0.5.

11. A glazing panel in accordance with claim 1, in which the base antireflective layer comprises a layer adjacent to the substrate comprising a nitride of aluminum or a nitride of silicon or a mixture thereof and an overlying layer comprising the mixed oxide layer.

12. A glazing panel in accordance with claim 1, in which the top antireflective layer comprises the mixed oxide and an overlying layer comprising a nitride of aluminum or a nitride of silicon or a mixture thereof.

13. A glazing panel in accordance with claim 1, in which the glazing panel is heat treatable or substantially haze free heat treated glazing panel and in which heat treatment of the heat treatable glazing panel to form the substantially haze free heat treated glazing panel provokes an increase of the value TL of the glazing panel of at least 2.5%.

14. A method of manufacturing a glazing panel having a haze of less than about 0.5 comprising the step of subjecting the glazing panel of claim 1, to a heat treatment process at at least 570° C.

15. A glazing panel in accordance with claim 1, in which the top antireflective layer comprises at least one mixed oxide layer which comprises an oxide which is a mixture of Zn and at least one additional material X, in which the atomic ratio X/Zn is greater than or equal to 0.12 and in which X is at least one element selected from the group consisting of the elements of groups 2a, 3a, 5a, 4b, 5b, 6b (CAS) of the periodic table.

* * * * *